(12) United States Patent
Hartmann et al.

(10) Patent No.: US 9,240,680 B2
(45) Date of Patent: Jan. 19, 2016

(54) SWITCH FOR A TRANSMISSION PATH FOR HIGH-VOLTAGE DIRECT CURRENT

(75) Inventors: Werner Hartmann, Weisendorf (DE); Lutz-Ruediger Jaenicke, Mahlow (DE); Sylvio Kosse, Erlangen (DE); Reinhard Maier, Herzogenaurach (DE); Anthoula Panagou, Zurich (CH); Norbert Trapp, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 128 days.

(21) Appl. No.: 14/006,749

(22) PCT Filed: Mar. 5, 2012

(86) PCT No.: PCT/EP2012/053700
§ 371 (c)(1),
(2), (4) Date: Sep. 23, 2013

(87) PCT Pub. No.: WO2012/126714
PCT Pub. Date: Sep. 27, 2012

(65) Prior Publication Data
US 2014/0016236 A1  Jan. 16, 2014

(30) Foreign Application Priority Data
Mar. 22, 2011  (DE) .......... 10 2011 005 905

(51) Int. Cl.
*H02H 7/00* (2006.01)
*H02H 3/08* (2006.01)
(Continued)

(52) U.S. Cl.
CPC .............. *H02H 3/08* (2013.01); *H01H 33/596* (2013.01); *H01H 89/00* (2013.01); *H02J 3/36* (2013.01); *Y02E 60/60* (2013.01)

(58) Field of Classification Search
CPC ........ H01H 33/596; H01H 89/00; H02H 3/08
See application file for complete search history.

(56) References Cited

U.S. PATENT DOCUMENTS 3,737,724 A * 6/1973 Salge et al. .................. 361/8
3,842,335 A   10/1974 Boksjo
(Continued)

FOREIGN PATENT DOCUMENTS

CA        1153096       8/1983
CN     201229893 Y     4/2009
(Continued)

OTHER PUBLICATIONS

Atmadji, A., "Direct current hybrid breakers: A design and its realization", 2000, Dept. of Electrical Engineering, Eindhoven University of Technology, Eindhoven, The Netherlands.
(Continued)

*Primary Examiner* — Thienvu Tran
*Assistant Examiner* — Tien Mai
(74) *Attorney, Agent, or Firm* — Laurence Greenberg; Werner Stemer; Ralph Locher

(57) ABSTRACT

A switch for a high-voltage direct current transmission path includes a vacuum circuit breaker for disconnecting the transmission path and a gas-insulated circuit breaker for disconnecting the transmission path. The gas-insulated circuit breaker is connected in series with the vacuum circuit breaker. A device is provided for building up a counter-current against the current in the transmission path for the purpose of reducing the current across the vacuum circuit breaker. The elements of the switch are actuated by a control device in such a way that the switch is switched off at or close to the zero crossing of the current.

7 Claims, 1 Drawing Sheet

(51) Int. Cl.
*H01H 33/59* (2006.01)
*H01H 89/00* (2006.01)
*H02J 3/36* (2006.01)

(56) References Cited

U.S. PATENT DOCUMENTS

| | | |
|---|---|---|
| 4,300,181 A | 11/1981 | Premerlani |
| 4,307,428 A | 12/1981 | Yanabu et al. |
| 5,517,378 A | 5/1996 | Asplund et al. |
| 5,821,496 A | 10/1998 | Mizufune et al. |
| 2004/0240240 A1* | 12/2004 | Bijlenga et al. ............ 363/56.12 |

FOREIGN PATENT DOCUMENTS

| | | |
|---|---|---|
| CN | 101986407 | 3/2011 |
| DE | 2936279 A1 | 3/1980 |
| FR | 2184916 A | 12/1973 |
| GB | 2031652 A | 4/1980 |
| JP | 60194824 S | 10/1985 |

OTHER PUBLICATIONS

T. Sena et al., "Development of HVDC Circuit breaker based on hybrid interruption scheme"; IEEE Transactions on Power Apparatus and Systems; vol. PAS-103, No. 3, Mar. 1984, pp. 545-552.

* cited by examiner

SWITCH FOR A TRANSMISSION PATH FOR HIGH-VOLTAGE DIRECT CURRENT

BACKGROUND OF THE INVENTION

Field of the Invention

The invention relates to a switch for a transmission path for high-voltage direct current transmission.

Circuit breakers are required for high-voltage direct current transmission (HVDC), in particular for establishing HVDC multi-terminal and HVDC network systems. Said circuit breakers have to be able to reliably switch off both the rated currents and short-circuit currents. Present rated voltages are 550 kV. In the future the rated voltages may reach 800 kV or even 1000 kV. The rated currents are approximately 2 to 5 kA. The short-circuit currents to be switched off can amount to a multiple of the rated current. A circuit breaker for high-voltage direct current transmission must additionally ensure galvanic isolation. Previous HVDC installations have been embodied as point-to-point solutions. Shutdowns of these installations are performed by a closed-loop control of the respective convertor stations.

BRIEF SUMMARY OF THE INVENTION

It is an object of the present invention to specify a switch for a transmission path for high-voltage direct current with which rated and short-circuit currents can reliably be switched off in conjunction with the simplest possible construction.

This object is achieved by means of a switch comprising the following features:

The switch according to the invention for a transmission path for high-voltage direct current comprises a series circuit comprising a first and a second switching device, wherein the first switching device is designed for interrupting current and the second switching device is designed for voltage isolation. Finally, the switch comprises a device for building up a counter-current against the current in the transmission path for the purpose of reducing the current through the switching devices. In this case, the first switching device preferably comprises a vacuum circuit breaker. The second switching device preferably comprises a gas-insulated, oil-insulated or low-oil-content circuit breaker.

For the invention it has been recognized that, advantageously, an improvement in the switching process can achieved by generating a counter-current that reduces the current flowing through the vacuum circuit breaker. In particular, a zero crossing of the current is generated in this case. This is possible since the polarity is known from the outset in the case of the HVDC installation, and does not change continuously, as in the case of alternating current.

Preferably, the device for building up a counter-voltage comprises a high-voltage capacitor and a switch. It is expedient if the elements are connected in parallel with the vacuum circuit breaker. In this case, in normal operation the high-voltage capacitor is charged, but is electrically decoupled at least on one side by the switch. If a current reduction is intended to take place, the switch is closed. The switch used can be a semiconductor switch such as a thyristor, for example, or else a second gas-insulated circuit breaker.

Preferably, the device for building up a counter-current comprises a high-voltage capacitor and a third switching device in series therewith and is connected in parallel with the first switching device. The third switching device used can be, for example, a thyristor or a further gas-insulated circuit breaker.

In one advantageous embodiment and development of the invention, the switch comprises a device for limiting the current rise connected in series with the first switching device. Said device can comprise, for example, an inductance in series with a parallel circuit comprising a nonlinear inductance and a capacitance. This advantageous solution obviates the cost- and energy-intensive superconducting solutions known from the prior art, which also always require a failsafe cryogenic engineering system.

The switch expediently comprises a control device. The latter is preferably designed to determine the change in the current with respect to time and to determine therefrom the presence of a short circuit, and, if a short circuit is present, to output control signals such that the first switching device is opened. The control device is furthermore preferably designed to drive the device for building up a counter-current, if a short circuit is present, to build up a counter-current and to drive the vacuum circuit breaker to switch off the current at the lowest possible magnitude of the current, in particular at a zero crossing of the current.

In a further embodiment of the invention, the control device sets the level of the counter-voltage on the basis of the measured change in the current. This results in a fast and reliable switch-off by the vacuum circuit breaker.

BRIEF DESCRIPTION OF THE SEVERAL VIEWS OF THE DRAWING

Preferred, but in no way restrictive, exemplary embodiments of the invention will now be explained in greater detail with reference to the figures of the drawing. In this case, the features are illustrated schematically. In the Figures.

DESCRIPTION OF THE INVENTION

Figure 1:
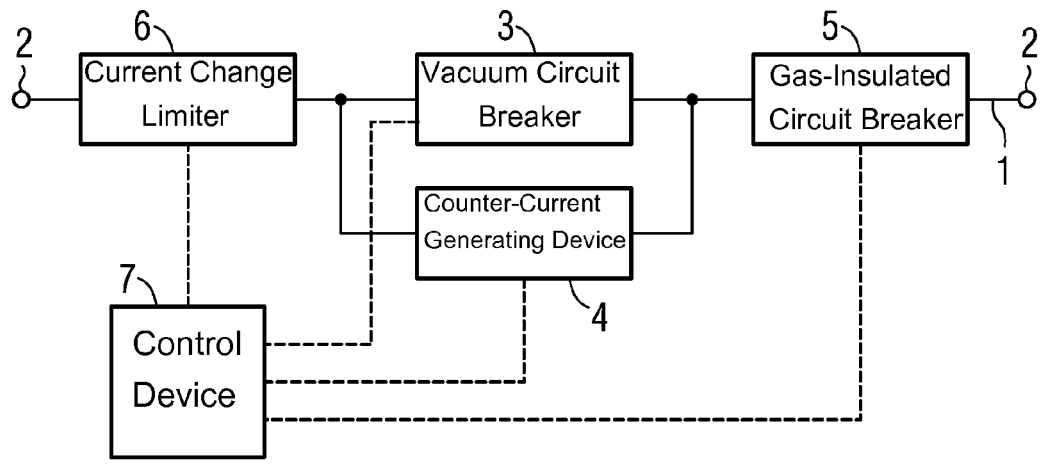
FIG. 1 shows a schematic construction of a switch for a high-voltage direct current transmission path.

FIG. 1 schematically shows the construction for an exemplary embodiment of a switch. The switch is arranged in a high-voltage direct current transmission path 1 and can be connected to further lines by a terminus 2. The switch comprises a vacuum circuit breaker 3. The vacuum circuit breaker 3 is realized in a known manner.

Figure 3:
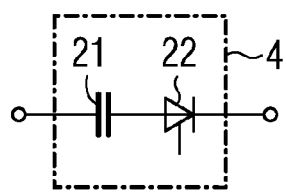
FIG. 3 shows a construction for a device for generating a counter-current.

Furthermore, the switch comprises a device 4 for generating a counter-current. One exemplary embodiment of such a device 4 for generating a counter-current is illustrated in FIG. 3. The device 4 for generating a counter-current comprises a high-voltage capacitor 21 and a thyristor 22 connected in series. As an alternative to the thyristor 22, here it is also possible to use some other semiconductor switch, such as an IGBT, for example.

Figure 2:
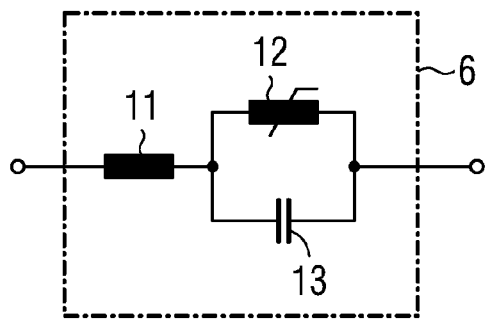
FIG. 2 shows a construction for a current change limiter.

The switch furthermore comprises a current change limiter 6. An exemplary construction for the current change limiter 6 is illustrated in FIG. 2. In this case, the current change limiter 6 comprises a parallel circuit comprising a nonlinear inductance 12 and a capacitor 13. This parallel circuit, for its part, is connected in series with a further inductance 11.

Furthermore, the switch comprises a gas-insulated circuit breaker 5, for example an $SF_6$ circuit breaker. The gas-insulated circuit breaker 5, the vacuum circuit breaker 3 and current change limiter 6 are in this case connected in series.

The device 4 for generating a counter-current is arranged in parallel with the vacuum circuit breaker 3.

Where necessary, a control device 7 is connected to the abovementioned elements. Thus, in this exemplary embodiment there is a connection from the control device 7 to the current change limiter 6, via which the control device 7 receives a measurement signal for the current change dI/dt. There is a further control connection between the control device 7 and the vacuum circuit breaker 3, and between the control device 7 and the device 4 for generating a counter-current. Finally, there is a connection between the control device 7 and the gas-insulated circuit breaker 5.

During operation, the control device 7 monitors the measured values for the change in the current with respect to time. In the case of a short circuit, the flowing current would rise greatly. The current change limiter 6 prevents this great rise for the time being. The control device 7 recognizes the presence of a short circuit from the current that is nevertheless rising. As a consequence, the control device 7 generates switching commands for the further elements of the switch. These control commands consist in opening the vacuum circuit breaker 3 and the gas-insulated circuit breaker 5, and in switching on the thyristor 22 in the device 4 for generating a counter-current. In this case, the control device 7 defines the temporal sequence of these commands. Expediently, a counter-current is generated rapidly. In this case, the generation of the counter-current is controlled in such a way that ideally a current zero crossing occurs. At the current zero crossing or close to the current zero crossing, the vacuum circuit breaker 3 is switched off. An additional switching-off of the gas-insulated circuit breaker 5 provides for the ultimately high dielectric strength and ensures that reignition does not take place in the vacuum circuit breaker 3.

The invention claimed is:

1. A switch for a high-voltage direct current transmission path, the switch comprising:

a series circuit including a first switching device and a second switching device, said first switching device configured for interrupting current and said second switching device configured for voltage isolation; and a device configured for building up a counter-current against a current in the transmission path for reducing a current through said switching devices, said device for building up the counter-current being connected in parallel with said first switching device and including a high-voltage capacitor and a third switching device connected in series with said high-voltage capacitor, said third switching device being a thyristor.

2. The switch according to claim 1, wherein said first switching device has a vacuum circuit breaker.

3. The switch according to claim 1, wherein said second switching device has a gas-insulated circuit breaker.

4. The switch according to claim 1, which further comprises a device connected in series with said first switching device for limiting a current rise.

5. The switch according to claim 4, wherein said device for limiting a current rise includes an inductance in series with a parallel circuit having a nonlinear inductance and a capacitance.

6. The switch according to claim 1, which further comprises a control device configured to determine a change in a current with respect to time and to determine therefrom a presence of a short circuit and, if a short circuit is present, to output control signals causing said first switching device to open.

7. The switch according to claim 6, wherein said control device is configured to drive said device for building up a counter-current, if a short circuit is present, to build up a counter-current and to drive said first switching device to switch off at a lowest possible magnitude of a current.

* * * * *